United States Patent [19]

Johnson

[11] Patent Number: 4,515,258
[45] Date of Patent: May 7, 1985

[54] CLUTCH DRIVE WITH LINK SPRING

[75] Inventor: Duane R. Johnson, Oberlin, Ohio

[73] Assignee: Allied Corporation, Morristown, N.J.

[21] Appl. No.: 473,425

[22] Filed: Mar. 9, 1983

[51] Int. Cl.³ .................. F16D 3/14; F16D 13/30; F16D 25/08
[52] U.S. Cl. ................. 192/91 A; 192/106.1; 192/106.2
[58] Field of Search ............... 192/66, 85 CA, 91 A, 192/106.1, 106.2, 110 B; 92/116, 129; 188/170; 464/61, 62, 65

[56] References Cited

U.S. PATENT DOCUMENTS

| | | | |
|---|---|---|---|
| 2,684,742 | 7/1954 | Eason | 192/91 A |
| 3,212,611 | 10/1965 | Ruoff et al. | 192/110 B |
| 3,467,071 | 9/1969 | Elmer | 123/41.12 |
| 3,684,397 | 8/1972 | Elmer | 416/39 |
| 3,757,914 | 9/1973 | Elmer | 192/48.3 |
| 3,777,866 | 12/1973 | Elmer | 192/91 A |
| 3,910,392 | 10/1975 | Foers | 192/70.28 |
| 3,985,214 | 10/1976 | Hall et al. | 192/91 A |
| 4,283,009 | 8/1981 | Deem | 236/86 |
| 4,445,605 | 5/1984 | Schilling | 192/91 A |

FOREIGN PATENT DOCUMENTS

| | | |
|---|---|---|
| 2196444 | 3/1974 | France . |
| 546343 | 7/1942 | United Kingdom . |
| 933653 | 8/1963 | United Kingdom . |
| 1259325 | 1/1972 | United Kingdom . |
| 2096718 | 10/1982 | United Kingdom . |

Primary Examiner—Rodney H. Bonck
Attorney, Agent, or Firm—Ken C. Decker; William N. Antonis

[57] ABSTRACT

A clutch drive (10) includes a spindle (16) mounting a driving member (94) and a driven member (126) for rotation about the spindle (16). The driving member (94) includes a pressure plate (96) which moves axially along the spindle (16) to engage and disengage from the driven member (122). Disengagement of the pressure plate (96) is effected by a piston and cylinder mechanism (34, 52) operated by compressed air. A plurality of circumferentially spaced springs (106) yieldably urge the pressure plate (96) into engagement with the driven member (126). A drive link (112) interconnects adjacent springs (106) to form a link through which driving torques are transmitted. The drive link (112) is curved, so that shock loads created upon engagement of the clutch are absorbed by straightening the drive link (112).

8 Claims, 5 Drawing Figures

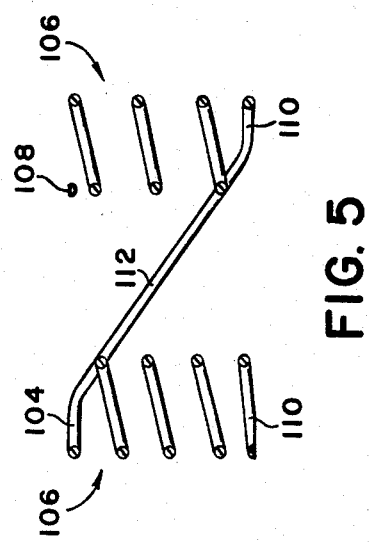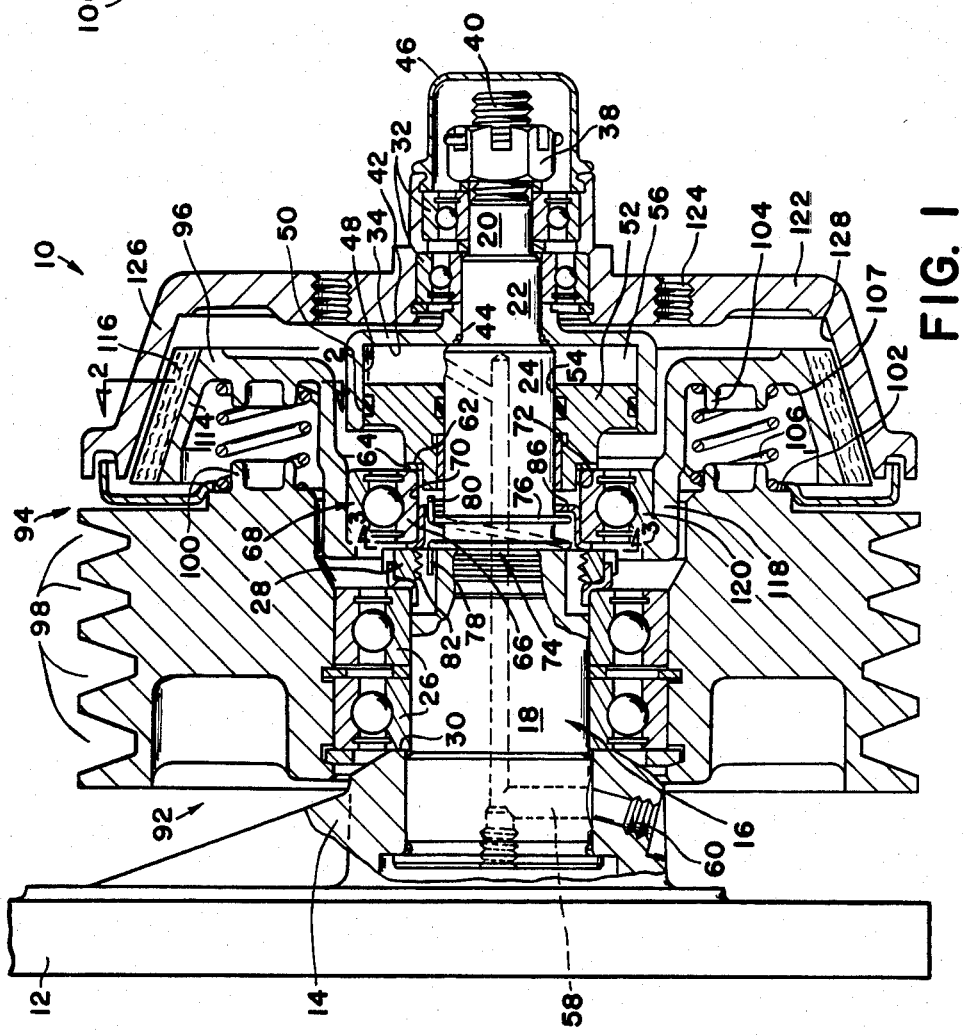

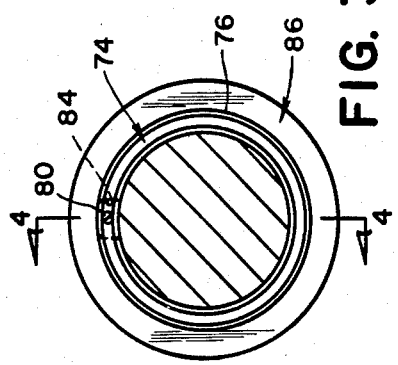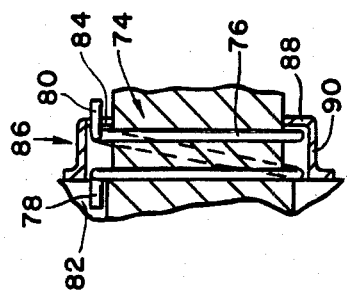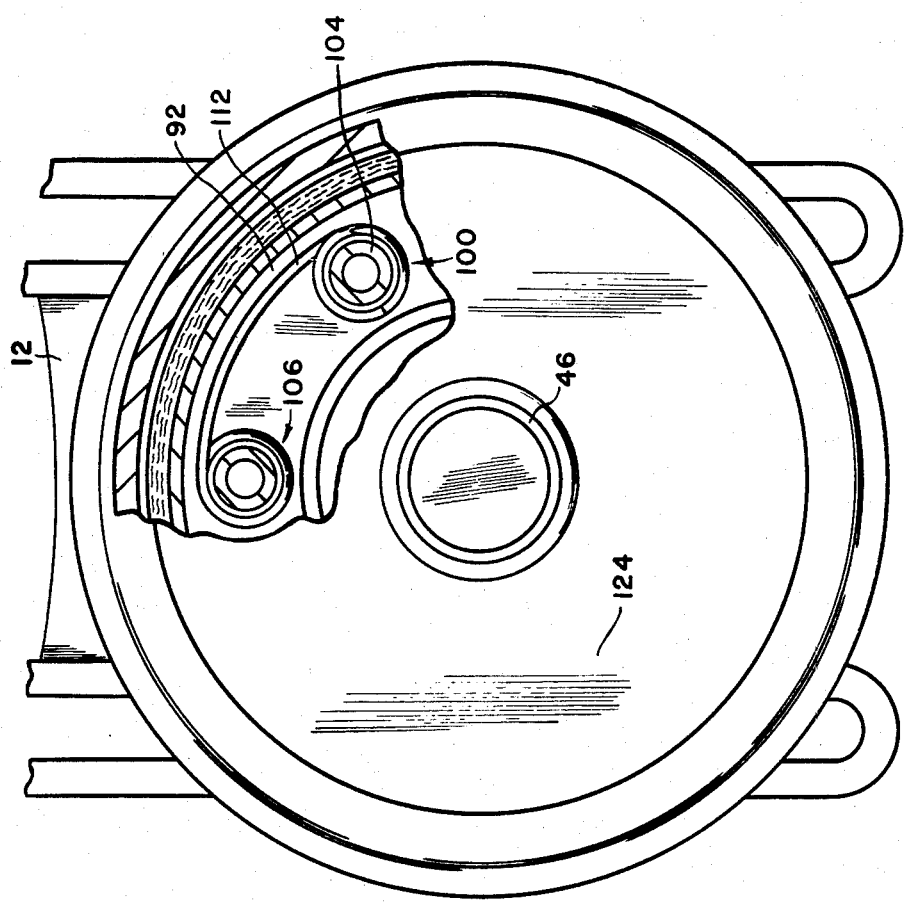

CLUTCH DRIVE WITH LINK SPRING

This invention relates to a fan clutch for a vehicle engine.

Modern heavy-duty vehicles are equipped with engine cooling fans that consume a significant portion of the power produced by the engine. However, the cooling effect of these fans is needed only during a relatively brief percentage of the time that the engine is operated. Accordingly, substantial savings can be effected by connecting the fan for powered rotation by the vehicle engine only when its cooling effect is necessary. Prior art clutching devices of this type are illustrated in U.S. Pat. 3,985,214 issued Oct. 12, 1976 to Hall et al. These devices comprise a spindle having an axis, a driving member and a driven member mounted for rotation about the axis of the spindle, pressure responsive means for effecting engagement and disengagement of the driving and driven members to effect a driving connection between the driving and driven members when said members are engaged and to brake said driving connection when the members are disengaged, one of said members including a portion movable parallel to the axis of the spindle and another portion fixed against axial movement relative to the spindle, first and second bearing means rotatably supporting the parallel movable portion and the fixed portion respectively for rotation about the spindle, and resilient means yieldably urging the parallel movable portion into driving engagement with the other member.

Unless such prior art devices were carefully designed, they often lacked durability because the shock loads generated during engagement of the clutch were relatively high, thereby accelerating wear of critical clutch components. Accordingly, the present invention proposes to drive the fan through a series of circumferentially spaced coil springs. The springs are sufficiently flexible to accommodate any shock loads that might occur, yet are made sufficiently rigid to transfer the driving forces to the fan by a drive link that interconnects adjacent coil springs. Accordingly, the drive link makes the springs sufficiently rigid to transmit the necessary driving torque, but are flexible enough to accommodate shock loads. Therefore, the present invention is characterized in that said resilient means is disposed between said parallel movable portion and said fixed portion of said one member to provide a drive path solely through said resilient means to transmit rotation between the portions of said one member, whereby said resilient means act both to transmit rotation between the portions of said one member and to yieldably urge said parallel movable portion into driving engagement with said other member.

Other features and advantages of the invention will become apparent in view of the accompanying description with reference to the accompanying drawings, in which:

FIG. 1 is a view, partially in transverse cross-section, of a clutch drive made pursuant to the teachings of our present invention;

FIG. 2 is a side elevation view of the clutch drive illustrated in FIG. 1, partly in cross-section taken substantially along lines 2—2 of FIG. 1;

FIG. 3 is a cross-sectional view taken substantially along lines 3—3 of FIG. 1; and FIG. 4 is a cross-sectional view taken substantially along lines 4—4 of FIG. 3; and FIG. 5 is a view of one of the springs used in the clutch drive shown in FIGS. 1-4.

Referring now to the drawings, a clutch drive generally indicated by the numeral 10 includes a support bracket 12 which is rigidly attached to a non-rotative portion of the vehicle adjacent the vehicle engine. The support bracket 12 includes a projecting portion 14 which mounts a spindle generally indicated by the numeral 16. The spindle is stepped to define a larger diameter portion 18, smaller diameter portions 20, 22 and a portion of intermediate diameter indicated generally by the numeral 24.

A pair of bearings 26 are mounted on the larger diameter portion 18 of the spindle 16 and are locked against axial movement by a lock nut 28 which threadably engages the portion 18 of the spindle 16 and clamps the bearings 26 against axial movement by holding them against the front face 30 of the projecting portion 14 of bracket 12. Another pair of bearings 32 are mounted on the smaller portions 20, 22 of the spindle 16. An annular cylindrical member 34 is also mounted in the smaller portion 20 of the spindle 16. The cylindrical member 34 and the bearings 32 are clamped against axial movement by a nut 38 which is screwed onto threaded portion 40 of the spindle 16 and which holds the cylindrical member 34 and the bearings 32 against one another and holds the inner radially extending face 42 of cylindrical member 34 against a shoulder 44 defined between the portions 20 and 24 of the spindle 16. A removable cap 46 protects the nut 38 and the spindle 16 against environmental contaminants.

The cylindrical member 34 defines an inner cylindrical surface 48 which slidably receives the outer circumferential surface 50 of an annular piston 52. The piston 52 defines an inner circumferential surface 54 which is slidably mounted on the portion 24 of the spindle 16. The piston 52 cooperates with the cylindrical member 34 to define a variable volume chamber 56 therebetween. Fluid pressure from a suitable source (not shown), such as from the vehicle air brake system, is communicated into the chamber 56 through passages generally indicated by the numeral 58 which extend through the spindle 16 to operate the piston 52. The passages 58 terminate in a fitting 60 to provide a connection with the aforementioned fluid pressure souce.

The piston 52 is stepped as at 62 to define a radially extending face which receives a washer 64. The washer 64 is disposed between the face 62 and the front face of the inner race 66 of a bearing generally indicated by the numeral 68. The inner circumferential surface 70 of the race 66 is of a diameter larger than the surface 72 on the piston 52 and is also larger than the diameter of the portion 24 of the spindle 16 so that a gap is defined between the inner race 66 and the surface 72 of the piston 52 and the portion 24 of the spindle 16. Accordingly, while movement of the piston 52 will be transmitted to the bearing 68 through the washer 64, the piston 52 does not support the weight of the bearing 68.

The inner race 66 of the bearing 68 is held against rotation relative to the spindle 16 and piston 52 by anti-rotation mechanism generally indicated by the numeral 74. The mechanism 74 includes a coiled spring generally indicated by the numeral 76, the coils of which are wrapped around the spindle 16. The end coils of the coiled spring 76 terminate in axially extending tabs 78, 80. The tab 78 is received within a notch 82 provided in the lock nut 28 and the tab 80 is received within a notch 84 in a collar generally indicated by the numeral 86. The collar 86 has an axially countersunk saddle 88 in which the notch 84 is defined. Collar 86 further includes an axially extending portion 90 which is pressed against the inner circumferential surface 70 of the inner race 66 of the bearing 68.

A pulley hub generally indicated by the numeral 92 is mounted on the bearings 26 for rotation about the spindle 16. The pulley hub 92 is an axially fixed portion of a driving member generally indicated by the numeral 94 which consists of the pulley hub 92 and a pressure plate generally indicated by the numeral 96. The pressure plate 96 is an axially movable portion of the driving member 94 and, as will be described hereinafter, is mounted for movement parallel to the axis of the spindle 16. The pulley hub 92 is provided with pulley faces 98 which are adapted to receive belts connecting the pulley hub 92 with the engine crankshaft so that rotation of the crankshaft turns the driving member 94. The pulley hub 92 is provided with circumferentially spaced bosses 100. Each of the bosses 100 projects from the face 102 of the hub 92 toward one of the circumferentially spaced bosses 104 that projects toward the bosses 102 from the face 107 of the pressure plate 96. Circumferentially spaced coiled springs 106 receive corresponding ones of the bosses 100, 104 in their opposite ends thereof. Each of the springs 106 includes a forward coil 108 that receives one of the bosses 104 and a rearward coil 110 that receives a corresponding one of the bosses 100. A drive link 112 connects the forward coil 108 of one spring 16 with the rearward coil 110 of an adjacent spring 106. As can best be seen in FIG. 2, the drive link 112 in its relaxed condition (i.e, when it is not transmitting force) is curved slightly. The pressure plate 96 further includes a tapered portion defining a conical surface 114. A conical band of friction material 116 is secured to the surface 110. The pressure plate 96 further includes an axially extending portion 118 which is secured to the outer race 120 of the bearing 68.

The bearings 32 mount a fan plate 122 for rotation about the spindle 16. The engine cooling fan (not shown) is secured to the fan plate 122 by bolts (not shown) threaded into threaded apertures 124 in the fan plate 122. The fan plate 122 terminates in a conical portion 126 which defines a conical engagement surface 128 which is engaged by the friction material 116 when the clutch is engaged to provide a driving connection between the driving member 94 and the driven member or fan plate 122.

In operation, springs 106 yieldably urge the pressure plate 96 to the right viewing FIG. 1 such that the friction material 116 frictionally engages the surface 128 on the fan plate 118 so that a driving connection is provided between the driving member 94 and the driven member or fan plate. Torque is transmitted to the pressure plate 96 through the springs 106 and the drive link 112. When force is transmitted through the drive link 112, the link straightens to abosrb the shock. Thereafter, drive torque is transmitted through the link 112. Accordingly, the vehicle engine turns the fan to provide engine cooling. However, when a conventional temperature sensor (not shown) senses that the cooling effect of the fan is no longer necessary, a valve mechanism (not shown) is actuated to communicate fluid pressure to the fitting 60. The temperature sensor and valve mechanism may be of the type generally shown in U.S. Pat. No. 4,283,009, issued Aug. 11, 1981 to Deem.

Fluid pressure communicated to the fitting 60 is communicated into the chamber 56 through the passages 58. Fluid pressure in the chamber 56 acts upon the piston 52, urging the latter to the left viewing FIG. 1. Because of the engagement of the shoulder 62 and washer 64 with the inner race 66 of the bearing 68 which is mounted on the pressure plate 96, movement of the piston 52 also urges the pressure plate 96 to the left viewing FIG. 1, thereby breaking the driving connection between the friction material 116 and the surface 128. Accordingly, while the pulley hub 92 will continue to be turned by the vehicle engine, the fan will be disconnected, so that the power used to turn the fan may be saved. When the cooling effect of the fan is again needed, the aforementioned temperature sensor and valve vent the fitting 60 to thereby vent the chamber 56, permitting the springs 106 to again urge the pressure plate 96 and the piston 52 to the right viewing the figure, thereby re-engaging the friction material 114 with the surface 128 to again provide a driving connection between the pulley hub 92 and the fan plate 122. Of course, in case of malfunction such that fluid pressure for some reason is not available, the springs 106 will maintain the clutch members engaged, so that the clutch is "fail-safe".

It will also be noted that the inner race 66 of the bearing 68 is prevented from rotation by the aforementioned anti-rotation mechanism 74. Without the mechanism 74, the inner race 66 would tend to rotate with the pressure plate, and, because of the engagement of the inner race 66 with the piston 52, rotation of the inner race would also tend to rotate the piston 52 on the spindle 16, thereby perhaps causing the O ring seals to fail prematurely. Such rotation of the piston 52 is prevented by the anti-rotation mechanism 74. The spring 76 collapses to accommodate axial movement of the pressure plate 92.

I claim:

1. Clutch drive comprising a spindle having an axis, a driving member and a driven member mounted for rotation about the axis of the spindle, pressure responsive means for effecting engagement and disengagement of the driving and driven members to effect a driving connection between the driving and driven members when said members are engaged and to break said driving connection when the members are disengaged, one of said members, including a portion movable parallel to the axis of said spindle and another portion fixed against axial movment relative to said spindle, first and second bearing means rotatably supporting said parallel movable portion and said fixed portion respectively for rotation about said spindle, and resilient means yieldably urging said parallel movable portion into driving engagement with said other member, said resilient means being disposed between said parallel movable portion and said fixed portion of said one member to provide a drive path solely through said resilient means to transmit rotation between the portions of said one member, whereby said resilient means act both to transmit rotation between the portions of said one member and to yieldably urge said parallel movable portion into driving engagement with said other member, said portions having circumferentially spaced bosses extending parallel to the axis of said spindle and projecting toward corresponding bosses on the other portion but being separated therefrom, said resilient means comprising circumferentially spaced coiled springs having opposite open ends receiving a corresponding boss on each of said portions, and a drive link interconnecting one of the coils of each of said springs with one of the coils of an adjacent spring.

2. Clutch drive as claimed in claim 1, further characterized in that said drive link is resilient to accommodate shock loads generated when the members are engaged.

3. Clutch drive comprising a spindle having an axis, a driving member and a driven member mounted for rotation about the axis of the spindle, pressure responsive means for effecting engagement and disengagement of the driving and driven members to effect a driving connection between the driving and driven members when said members are engaged and to break said driving connection when the members are disengaged, one of said members including a portion movable parallel to the axis of said spindle and another portion fixed against axial movement relative to said spindle, first and second bearing means rotatably supporting said parallel movable portion and said fixed portion respectively for rotation about said spindle, and resilient means yieldably urging said parallel movable portion into driving engagement with said other member, said resilient means being disposed between said parallel movable portion and said fixed portion of said one member to provide a drive path solely through said resilient means to transmit rotation between the portions of said one member, whereby said resilient means act both to transmit rotation between the portions of said one member and to yieldably urge said parallel movable portion into driving engagement with said other member, said resilient means comprising coiled compression springs spaced circumferentially about said spindle and engaging said parallel movable portion of said fixed portion, and means connecting one coil of each of said compression springs to a coil of an adjacent spring.

4. Clutch drive as claimed in claim 3, wherein said connecting means is a drive link interconnecting said adjacent springs, said drive link being resilient to accommodate shock loads generated when the members are engaged.

5. Clutch drive as claimed in claim 4, further characterized in that said drive link is bowed, said shock loads straightening the drive link to absorb the shock.

6. Clutch drive as claimed in claim 4, further characterized in that each of said springs has a pair of opposite end coils engaging respectively the parallel movable portion and the fixed portion, said drive links interconnecting the end coil engaging the fixed portion with the end coil engaging the parallel movable portion of adjacent springs.

7. Clutch drive comprising a spindle having an axis, a driving member and a driven member mounted for rotation about the axis of the spindle, pressure responsive means for effecting engagement and disengagement of the driving and driven members to effect a driving connection between the driving and driven members when said members are engaged and to break said driving connection when the members are disengaged, one of said members including a portion movable parallel to the axis of said spindle and another portion fixed against axial movement relative to said spindle, first and second bearing means rotatably supporting said parallel movable portion and said fixed portion respectively for rotation about said spindle, and resilient means yieldably urging said parallel movable portion into driving engagement with said other member, said resilient means being disposed between said parallel movable portion and said fixed portion of said one member to provide a drive path solely through said resilient means to transmit rotation between the portions of said one member, whereby said resilient means act both to transmit rotation between the portions of said one member and to yieldably urge said parallel movable portion into driving engagement with said other member, the bearing means supporting said parallel movable portion cooperating with said pressure responsive means to define a gap therebetween, said fixed portion and said parallel movable portion having complimentary conical surfaces circumscribing said spindle to center said parallel movable portion when the clutch is disengaged.

8. Clutch drive comprising a spindle having an axis, a driving member and a driven member mounted for rotation about the axis of the spindle, pressure responsive means for effecting engagement and disengagement of the driving and driven members to effect a driving connection between the driving and driven members when said members are engaged and to break said driving connection when the members are disengaged, one of said members including a portion movable parallel to the axis of said spindle and another portion fixed against axial movement relative to said spindle, first and second bearing means rotatably supporting said parallel movable portion and said fixed portion respectively for rotation about said spindle, and resilient means yieldably urging said parallel movable portion into driving engagement with said other member, said resilient means being disposed between said parallel movable portion and said fixed portion of said one member to provide a drive path solely through said resilient means to transmit rotation between the portions of said one member, whereby said resilient means act both to transmit rotation between the portions of said one member and to yieldably urge said parallel movable portion into driving engagement with said other member, said resilient means being spaced circumferentially with respect to said portions and including means for providing a force transmitting connection between adjacent resilient means.

* * * * *